J. J. Mann,
Mower.
Nº 14404. Patented Mar 11 1856
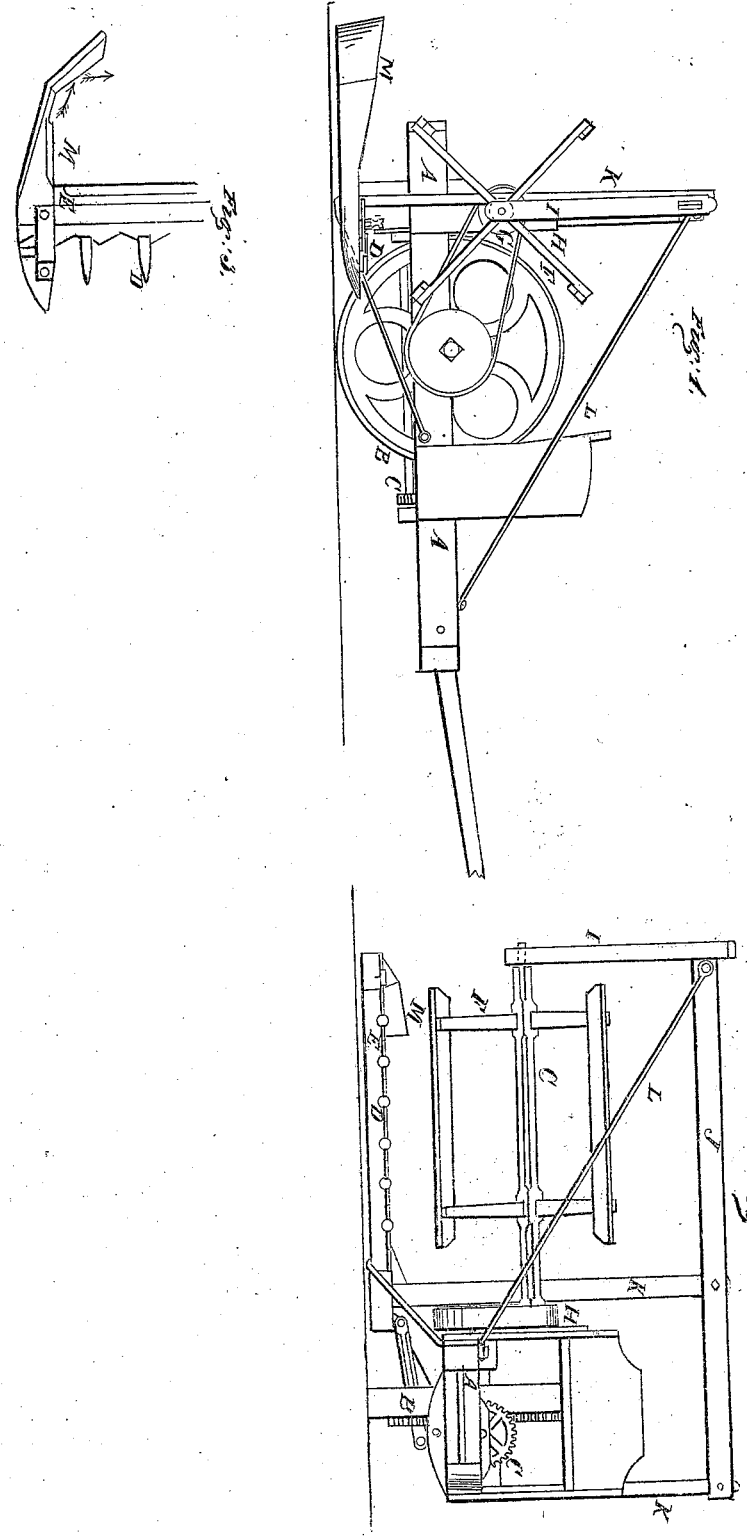

UNITED STATES PATENT OFFICE.

JACOB J. MANN, OF WESTVILLE, INDIANA.

IMPROVEMENT IN MOWING-MACHINES.

Specification forming part of Letters Patent No. 14,404, dated March 11, 1856.

*To all whom it may concern:*

Be it known that I, JACOB J. MANN, of Westville, in the county of La Porte and State of Indiana, have invented a new and useful Improvement in Mowing-Machines; and I do hereby declare that the following is a full, clear, and exact description of the same, reference being had to the annexed drawings, making a part of this specification, in which—

Figure 1 is a side view of my improved mowing-machine. Fig. 2 is a front view of the same. Fig. 3 is a detached plan or top view of the track-clearer.

Similar letters of reference indicate corresponding parts in the several figures.

The nature of my invention consists in the peculiar manner of hanging the reel of the machine, as will be hereinafter shown and described, whereby the cut grass is allowed to pass over the cutter-bar without any obstruction caused by the supports of the reel.

To enable others skilled in the art to fully understand and construct my invention, I will proceed to describe it.

A, Figs. 1 and 2, represents the frame of the machine, constructed in the usual manner, and having the ordinary driving-wheel, B, attached to it, and gearing C, by which motion is given the reciprocating cutters D.

The above parts are in common use, and require no particular description.

E is the cutter-bar, over which the reel F works. The reel F is of the usual construction. One end of its shaft G—the inner end—works in a bearing in an upright, H, attached to the frame A. The opposite end of the shaft G works in the lower part of a pendant, I. (See Figs. 1 and 2.) The pendant I is secured at the end of a horizontal bar, J, the bar J being secured to the upper ends of two uprights, K K, which are attached to the frame A. (See Fig. 2.) The end of the bar J to which the pendant I is secured is braced by a metallic rod, L, one end of which is bolted to the front end of the frame A and the opposite end to the bar J.

M is a track-clearer, which is secured to the outer end of the cutter-bar E. The track-clearer extends back of the cutter-bar and curves inward, as shown clearly in Fig. 3, so that as the machine moves along the cut grass will be thrown inward free or clear from the outer end of the cutter-bar, as indicated by the arrows in Fig. 3.

The track-clearer keeps the track for the horses free from cut grass, and prevents the driving-wheel and gear connected with it from being clogged or choked.

By having the outer end of the shaft G of the reel F work in the pendant I no obstruction is offered to the grass at the outer end of the cutter-bar, as is the case when an upright support or framing is attached to the outer end of the cutter-bar, as is now done, to form a bearing for the shaft G.

Having thus described my invention, what I claim as new, and desire to secure by Letters Patent, is—

The construction of the reel-frame I J K K, the same being braced by the rod L, and the suspension of the reel F at the outer extremity of the shaft G by the pendant I.

JACOB J. MANN.

Witnesses:
G. L. THOMPSON,
WM. C. MARTIN.